United States Patent [19]

Stangel et al.

[11] Patent Number: 5,021,793
[45] Date of Patent: Jun. 4, 1991

[54] PHASED ARRAY ANTENNA METHOD AND SYSTEM FOR ADAPTIVELY POSITIONING NULLS

[75] Inventors: John J. Stangel, Mahopac; John C. Herper, Glen Cove, both of N.Y.

[73] Assignee: Unisys Corporation, Blue Bell, Pa.

[21] Appl. No.: 423,080

[22] Filed: Oct. 18, 1989

[51] Int. Cl.[5] .............................. G01S 3/16; G01S 3/28
[52] U.S. Cl. .................................................... 342/383
[58] Field of Search ................ 342/372, 375, 380, 383

[56] References Cited

U.S. PATENT DOCUMENTS 4,217,586  4/1980  McGuffin .
4,720,712  1/1988  Brookner et al. ................. 342/383
4,821,037  4/1989  Miller et al. ....................... 342/383

Primary Examiner—Theodore M. Blum
Attorney, Agent, or Firm—Seymour Levine; Mark T. Starr

[57] ABSTRACT

A system for adaptively positioning nulls in the pattern of an antenna utilizing an auxiliary antenna in conjunction with a correlation receiver to determine the gain in amplitude and phase of the antenna pattern at the location of the interfering source. This gain is then utilized with the known gain at the peak of the main lobe of the antenna to compute coefficients of sinusoidal perturbation functions applied to the phase function of the antenna to establish a null in the direction of the interfering source.

15 Claims, 7 Drawing Sheets $$(1a)\ g(u) = \frac{1}{2\pi}\int_{-1}^{1} f(x)\,e^{jux}\,dx$$

$$(1b)\ f(x) = \int_{-\infty}^{\infty} g(u)\,e^{-jux}\,du$$

$$(2a)\ f(x) = f_0(x)\,e^{ja(x)}$$

$$(2b)\ f(x) \simeq f_0(x)\left[1 + ja(x)\right]$$

$$(3)\ g(u) = g_0(u) + j\frac{1}{2\pi}\int_{-1}^{1} f_0(x)\,a(x)\,e^{jux}\,dx$$

$$(4)\ a(x) = A\ \text{SIN}(u_0 x) + B\ \text{SIN}(u_0 x)$$

$$(5)\ g(u) = g_o(u) + \frac{C}{2\pi}\int_{-\infty}^{\infty} f(x)\,e^{j(u+uo)x}\,dx - \frac{C^*}{2\pi}\int_{-\infty}^{\infty} f(x)\,e^{j(u+uo)x}\,dx$$

$$= g_o(u) + C\,g_o(u+uo) - C^*\,g_o(u-uo)$$

$$C = \frac{A+jB}{2} \quad C^* = \frac{A-jB}{2}$$

$$(6)\ a(x) = \sum_{n=1}^{J} A_n\,\text{SIN}\,u_n X + B_n\,\text{COS}\,u_n X$$

FIG. 3a.

$$(7) \quad g(u) = g_0(u) + \sum_{j=1}^{J} \left[ C_n g_0(u+u_n) - C_n^* g_0(u-u_n) \right]$$

$$(8) \quad a(x) = \sum_{n=1}^{J} A_n \sin\left[(u_n + u_d)x\right] + B_n \sin\left[(u_n + u_d)x\right]$$

$$(9) \quad g(u) = g_0(u) + \sum_{n=1}^{J} \left[ C_n g_0(u+u_n+u_d) - C_n^* g_0(u-u_n-u_d) \right]$$

$$(10) \quad g(u) = g_0(u) + \sum_{n=1}^{J} \left[ C_n g_0(u+u_n+u_d) - C_n^* g_0(u-u_n) \right.$$
$$\left. + D_n g_0(u+u_n+u_d) - D_n^* g_0(u-u_n-u_d) \right]$$

$$(11) \quad h(u) = h_0(u) + \sum_{n=1}^{J} \left[ C_n h_0(u+u_n) - C_n^* h_0(u-u_n) \right.$$
$$\left. + D_n h_0(u+u_n+u_d) - D_n^* h_0(u-u_n-u_d) \right]$$

FIG. 3b.

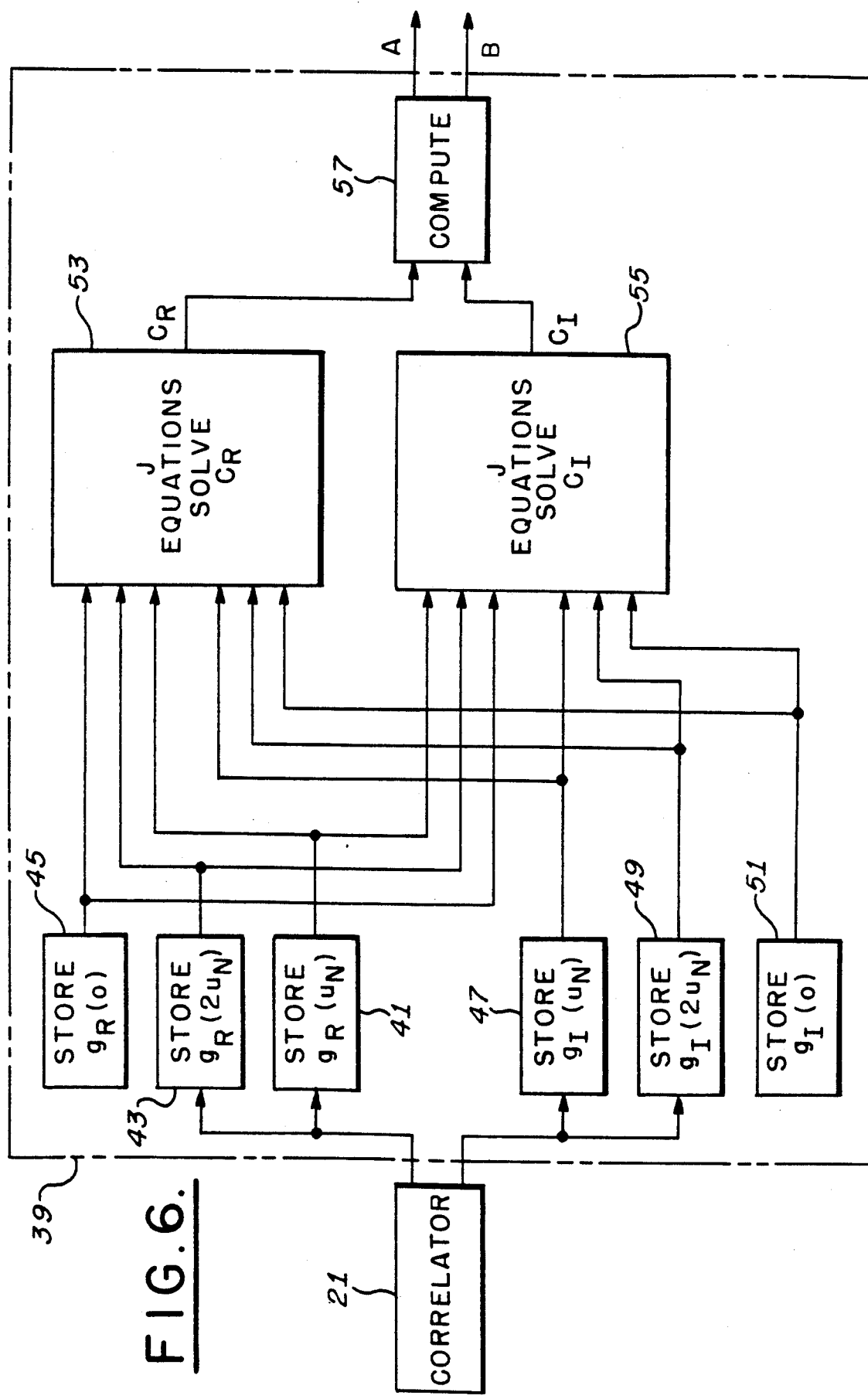

PHASED ARRAY ANTENNA METHOD AND SYSTEM FOR ADAPTIVELY POSITIONING NULLS

BACKGROUND OF THE INVENTION

1. Field of the Invention

The invention pertains to the field of phased array antennas, and more particularly to phased array antennas capable of adaptively positioning nulls at desired angular locations.

2. Description of the Prior Art

Antennas which automatically respond to an interference environment, in real time, by steering nulls to and reducing sidelobe levels in the directions of the interference, while retaining the desired main beam characteristics are known in the prior art. These systems usually comprise an array of antenna elements and a real time adaptive receiver-processor which adjusts its element weights toward some optimization of output signal-to-noise ratio in accordance with the selected feedback control algorithm. Generally, the adjustments include both amplitude and phase. Techniques exist, however, for reducing sidelobes and providing nulls in prescribed directions with phased array antennas using phase control only. Utilizing these techniques in a multiple jammer environment with a real antenna, for which sidelobe performance is primarily governed by electrical and mechanical tolerances, is a problem of considerable magnitude. Under these conditions, the determination and implementation of the required phase perturbations is an extremely time consuming process that renders such antennas impractical for many applications.

One antenna of the prior art uses multiple auxiliary antenna apertures which are generally distinct from the main antenna aperture. Jamming signals received by the auxiliary antenna apertures are fed into the received channels of the principal aperture by digital or analog Applebaum loops containing amplifiers with electrically controllable gain and phase. Nulling is accomplished by iteratively solving a co-variance matrix having dimensions proportionate to the number of auxiliary antennas. Convergence is rapid and cancellation is effected if the number of jammers $N_J$ does not exceed the number of canceller antenna loops $M_L$. In this system, the performance degrades substantially when $N_J$ is greater than $M_L$. Consequently, the cost effectiveness of this approach is extremely sensitive to the jamming threat, since this dictates the number of loops needed. Each loop requires additional antenna real estate and replication of significant portions of the radar receiver.

The jammer-canceller loop limitation is effectively eliminated in a fully adaptive array, the basic theory of which is well known. A full adaptive array utilizes correlation techniques and feedback control to apply amplitude and phase weights commensurate with the radiation environment to each array element to achieve minimum interference. An excessively large number of phase and amplitude variables must be determined, however, for a fully adaptive large array having thousands of elements. Determination of these variables must be accomplished for a relatively small number of conditions to be satisfied, i.e., nulls to be established. To provide the phase and amplitude weights in real time for such adaptive array antennas, large data strains must be processed. With current technology, the hardware required for such processing is of prohibitive complexity.

In an article entitled "Adaptive Sidelobe Nulling Using Digitally Controlled Phase Shifters" appearing in the IEEE Transactions, Antennas and Propagation, Volume AP-24, No. 5, September 1976, Baird & Rassweiler, addressed this fundamental complexity issue when they recognized that adaptive nulling could be effected by phase control only. This technique provides adaptive nulling by trimming the phase shifters which are used to scan and collimate the surveillance beams in accordance with the sensed interference environment. To reduce the quantity of sensing hardware required, a quasi random search routine, based on a priori knowledge of approximate interfering source locations is implemented. This routine includes interative switching of the smaller phase shifter bits and measurement of incident jamming signals. The convergence of the radiation pattern to effect significant jammer suppression is consequently relatively slow and heavily dependent on a number of jammers and the switching speed of the phase shifters.

SUMMARY OF THE INVENTION

An adaptive antenna in accordance with the principles of the present invention uses the large number of degrees of freedom inherent in the phase control beam steering of large arrays while taking advantage of the limited number of jammers actually in the antenna field of view to minimize sampling measurements, computations, and hardware. Measured data from a single auxiliary electronically scanned array is correlated with the main array response to rapidly place quality nulls in the main antenna pattern sidelobes corresponding to directions of interfering noise sources. This practical and implementable approach provides substantial interference rejection for a radar system regardless of the number, type, or deployment of the interfering sources. Noise signals received in the auxiliary beam are correlated with those in the main beam to facilitate measurement of sidelobe amplitude and phase in a jammer direction. A small phase perturbation is then computed and implemented by adjusting the phase shifters of the main antenna to generate pattern nulls in the prescribed directions of all jammers. The equipment required to achieve null positioning using auxiliary antenna data correlated with the main antenna data is easily implemented. A single scan line source and one receiver/correlator added to the system and some modest computational capability is all that is required for each simultaneous antenna beam.

BRIEF DESCRIPTION OF THE DRAWINGS

FIG. 3 is a list of equations useful for explaining the invention.

FIG. 6 is a block diagram of a processor which may be utilized for calculating phase perturbation coefficients.

DESCRIPTION OF THE PREFERRED EMBODIMENT

Figure 1:
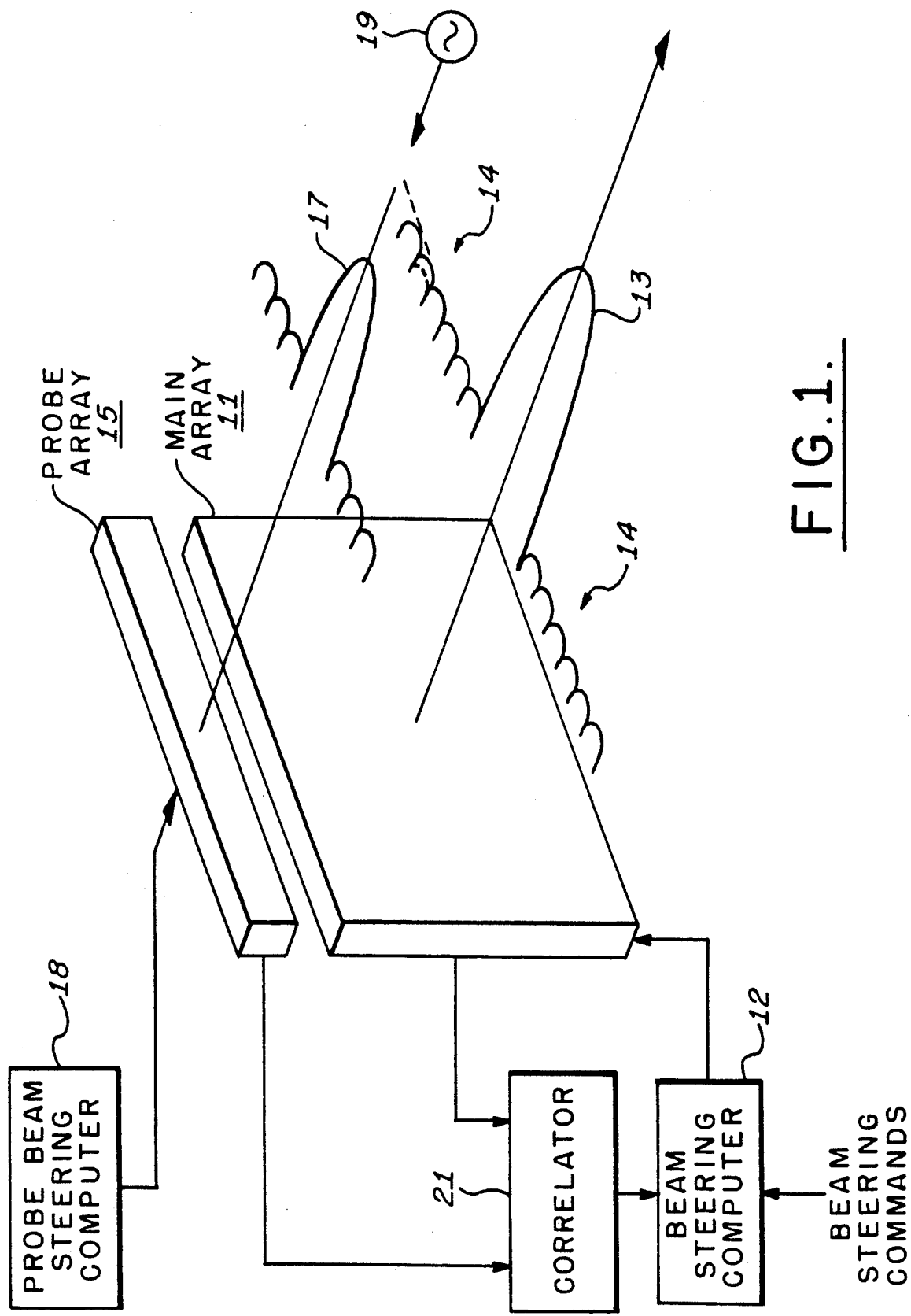
FIG. 1 is a block diagram of a preferred embodiment of the invention indicating thereon the probe array and main array antenna patterns that are correlated to provide the desired phase perturbations.

Refer now to FIG. 1. An adaptive array in accordance with the present invention includes a main array 11, which may be a planar array, a beam steering computer 12 for steering a main antenna beam 13 provided by the main array 11, and a probe array 15, which may also be a planar array, providing a probe beam 17 steered by a probe beam steering computer 18.

The probe array 15 and its feed network are constructed to provide the probe beam 17 with an azimuthal beamwidth that is comparable to that of the main beam 13. Since the elevation beam shape is not critical, the probe array 15 may have a wide or shaped elevation beam, thereby providing what is generally known in the art as a fan beam. The feed network of the probe array 15, utilized for forming the azimuthal pattern of the probe beam 17, is substantially the same as the feed network of the main array 11, utilized for forming the azimuthal pattern of the main beam 13. In operation, the main lobe of the probe beam 17 is directed to an interfering source 19 by the probe beam steering antenna. When so positioned, the output signal of the probe array is primarily a function of the signal emitted from the interfering source 19. When more than one interfering source exists in the field of view of the main antenna 11, the signal output therefrom includes signals from all these interfering sources received through sidelobes 14 of the main antenna pattern 13. The outputs of the probe array 15 and the main array 11 are coupled to a correlator 21, which may be of a design generally known in the art, wherefrom signals representative of correlations of the output signals from the main array 11 with the output signals of the probe array 15 are coupled to the beam steering computer 12 wherein phase perturbations are determined and applied to a predetermined number of phase shifters of the main antenna to produce nulls in the directions of interfering sources 19.

Figure 2:
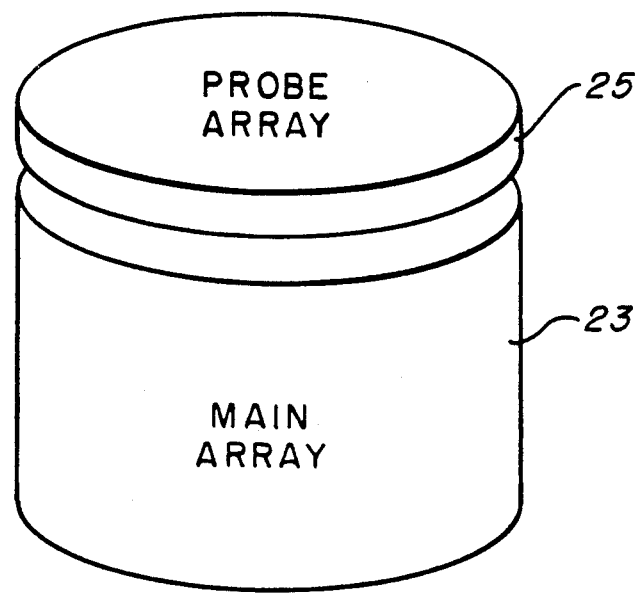
FIG. 2 is a representation of cylindrical arrays which may be utilized for the probe and main antennas, respectively.

Through the main array 11 and the probe array 15 are shown as planar arrays in FIG. 1, it should be recognized that arrays of other configurations may be employed. One such configuration is illustrated in FIG. 2 wherein the main array 23 and the probe array 25 are cylindrical arrays. Other configurations that may be employed are the dome antenna and conical array. All of these provided advantages as compared with planar arrays in that they exhibit uniform radiation patterns over a full 360° azimuthal scan.

When a sinusoidal phase perturbation function of the azimuth coordinate of a phased array is added to the phase function for a selected beam position, two small replicas of the main beam appear in the sidelobes on both sides of the main beam. The position and amplitude of the replica beams are determined by the period and amplitude of the perturbations. These beams may be utilized to cancel the unperturbed pattern at any point in the sidelobe region where a null is desired.

It is well known that the beam pattern of a linear array and the linear array excitation functions, $g(u)$ and $f(x)$ respectively, are the Fourier transform pairs shown in equations 1a and 1b shown in FIG. 3. In these equations, $x$ is the linear array position parameter and $u$ is a parameter proportional to $\sin \theta$, where $\theta$ is the direction in space measured from the normal to the array. The excitation function $f(x)$ may be represented as shown in equation 2a where $f_o(x)$ is the unperturbed array excitation function and $a(x)$ is an array phase perturbation function. If $a(x)$ is sufficiently small, the excitation function of equation 2a may be represented by the first two terms of a Taylor expansion as shown in equation 2b. Utilizing equation 2b in the transform equation 1a yields an equation for the perturbed beam pattern function in terms of the unperturbed beam pattern function $g_o(u)$ as shown in equation 3. Assume that $a(x)/2\pi$ is a sinusoidal function as shown in equation 4, where A and B are real numbers. This phase perturbation function provides an array pattern function represented in equation 5. It is evident from equation 5, that a small sinusoidal phase perturbation applied to an array which initially produces an unperturbed pattern $g_o(u)$ establishes a pattern having the original pattern plus two small replicas of the original pattern displaced on either side of the original pattern by an angle function $-u_O$ and $u_O$ and having amplitudes C and $-C^*$ relative to the amplitude of the original pattern, $C^*$ being the complex conjugate of C.

The two replica beams may be utilized for cancelling the small fields in the sidelobe region of the unperturbed pattern at the angular position of an interfering source. This may be accomplished by setting the function $g(u_J)$ to zero, where $u_J$ is the angle parameter for the position of the interfering source, and solving for C and $C^*$. If the original beam is a single peaked broadside beam at $u=0$ for example, then $u_o$ should be made equal to $u_J$ to place the replica beam at the interfering source location. If the original pattern is a difference pattern, $u_O$ should be offset slightly from $u_J$ so that either of the two peaks of the replica difference pattern rather than its null falls at the jammer position. To accomplish this, $u_O$ should be set equal to $u_J \pm u_D$ where $u_D$ is the offset. It should be apparent that by varying the period and position of a sinusoidal phase perturbation, a null may be achieved in the sidelobe region of the antenna pattern.

Those skilled in the art should recognize that additional sinusoidal perturbations may be applied to the array excitation function to provide additional nulls in the sidelobe pattern in the respective directions of the multiplicity of interfering sources. For this multiplicity of interfering functions to a single peaked main antenna beam, the phase perturbation function $a(x)$ is the summation shown in equation 6 of FIG. 3. Applying this perturbation function to the beam pattern function results in the beam pattern function presented in equation 7. This beam pattern function describes a main beam plus a pair of small replica beams which are associated with each sinusoidal component. Setting $g(u_J)$ equal to zero for each $u_J$ where a null is desired provides a set of two J equations from which the real and imaginary components of each $C_J$ complex number may be determined, thus providing the A and B coefficients for the sine and cosine functions of the phase perturbation function.

When the original pattern is a difference pattern with peaks at $\pm u_D$, the phase perturbation function for multiple interfering sources is that represented by equation 8 and the resulting beam pattern is represented by equation 9. Equation 9 may be solved for C and $C^*$ in the same manner as equation 7 and therefrom determine the coefficients A and B of the sinusoidal functions.

The same approach may be used to produce simultaneous nulls in both sum and difference patterns. This, however, requires doubling the number of sinusoidal perturbation components, two for the difference pattern and two for the sum pattern. Since the components for the difference pattern require an offset $u_D$ and those for the sum pattern do not require an offset, the phase perturbation to be applied to both sum and difference excitations contain offset and non-offset components as given in equation 10, which establishes sum and difference patterns given by equation 11. In equation 10 and 11, g(u) is the sum pattern and h(u) is the difference pattern. In these equations, setting $g(u_J)=0$ and $h(u_J)=0$ at the J desired null locations provides 4J equations from which the 4J coefficients $C_J$, $C^*_J$, $D_J$ and $D^*_J$ may be determined.

Implicit in the procedure described above is the assumption that the function $g_O(u)$ is known from theory or by measurement so that $g_O(u_J)$, $g_O(2u_J)$ and $g_O(O)$ are available for use in equation 7. The latter quantity is readily computed or measured for it lies in the main beam of the antenna. The first two quantities, however, cannot be computed for large antennas designed for low sidelobes. These antennas exhibit detailed patterns in the sidelobe region which are extremely distorted by the excitation function and mechanical tolerance errors. Therefore, in accordance with the principles of the invention, the sidelobe quantities are determined with the utilization of the probe antenna 15, 25 shown in FIGS. 1 and 2, respectively, and the correlator 21. In operation, the probe antenna may be steered to the angular location of an interfering source wherefrom the emanating signal is received on the main beam of the probe array 15, 25 wherein it is dominant over all other interfering sources in the sidelobe region of the main array. The correlator 21 uses the relatively clean signal from the probe antenna 15, 25, to detect the level of the signals from the interfering source of interest received by the main antenna 11, 23 in the sidelobe region at the angle functions $u_J$ and $2u_J$. The signal level at the angle function $2u_J$ is obtained by steering the main beam of the main antenna through an angle corresponding to $u_J$ so that the interfering source is at the position in the sidelobe region corresponding to the angle function $2u_J$.

Figure 4:
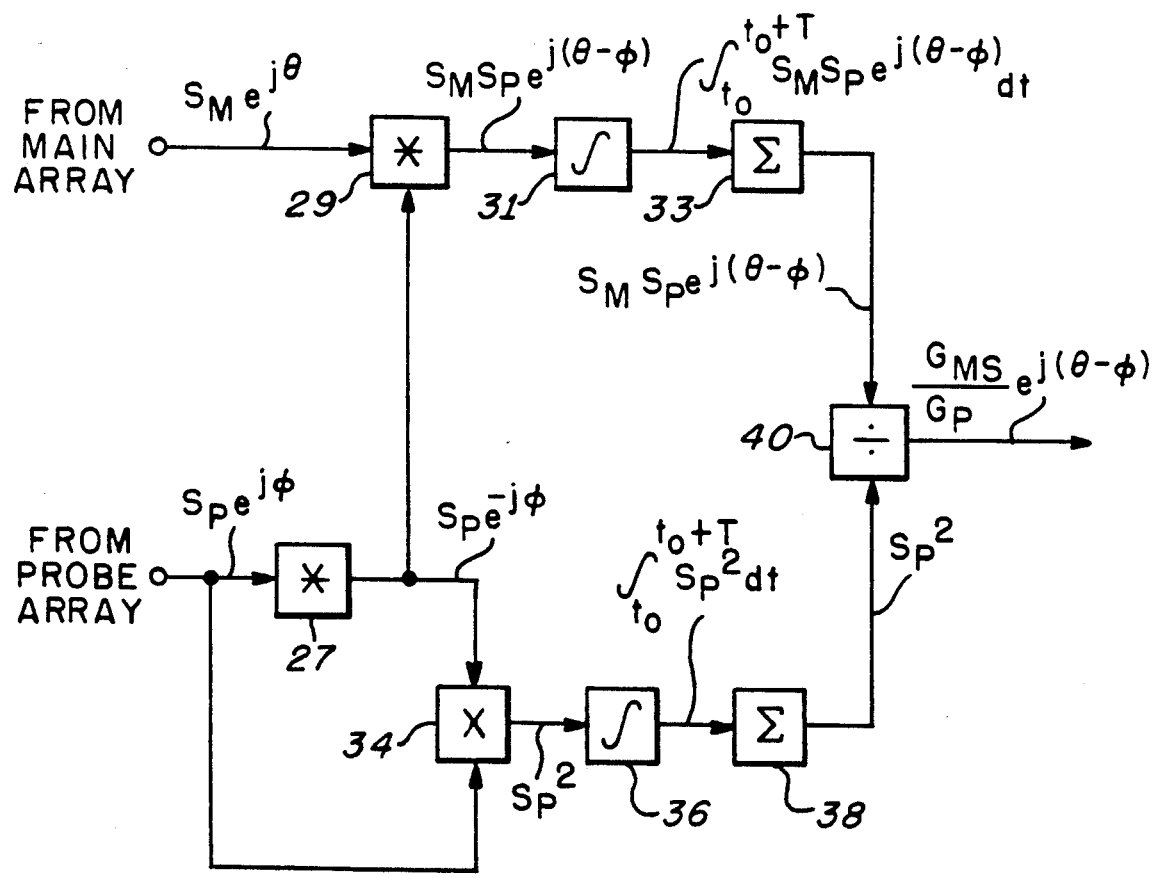
FIG. 4 is a block diagram of a circuit which may be utilized as the correlator of FIG. 1.
Figure 5A:
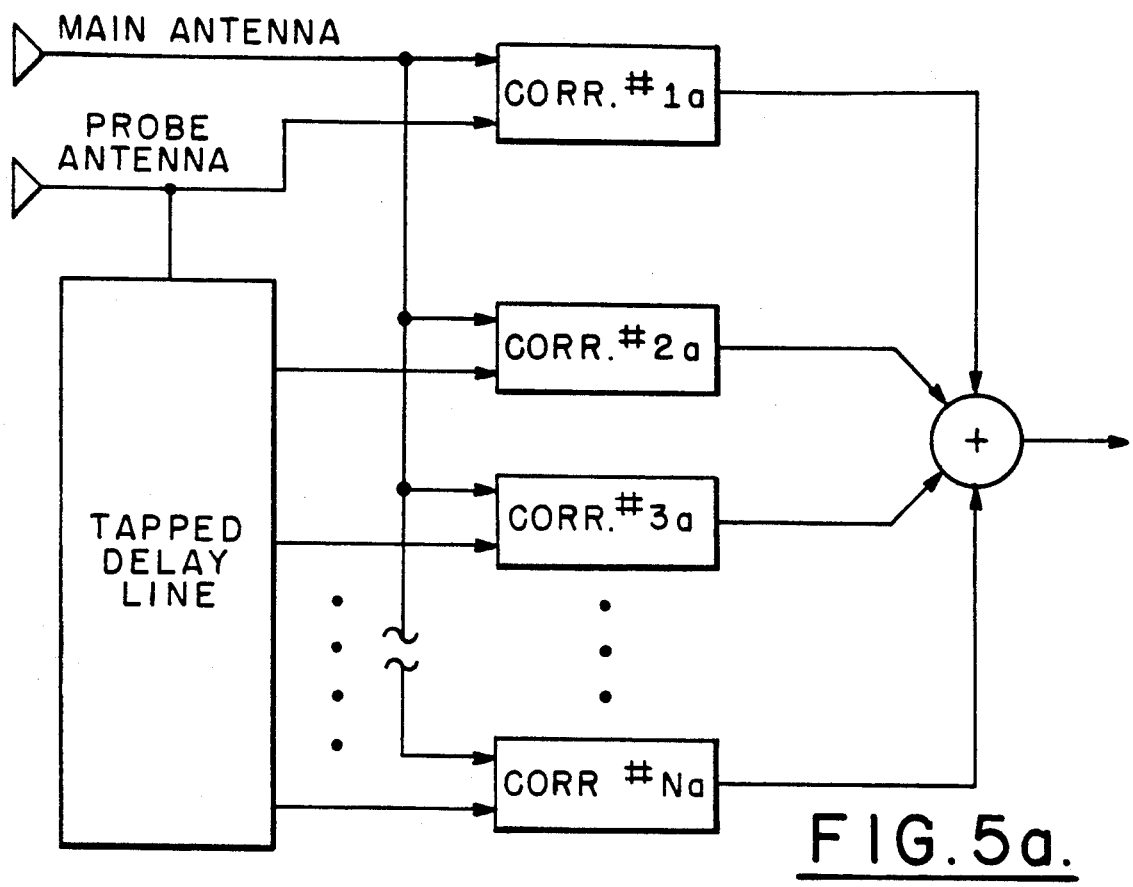
FIGS. 5A and 5B are block diagrams of time alignment circuitry for signal correlation.
Figure 5B:
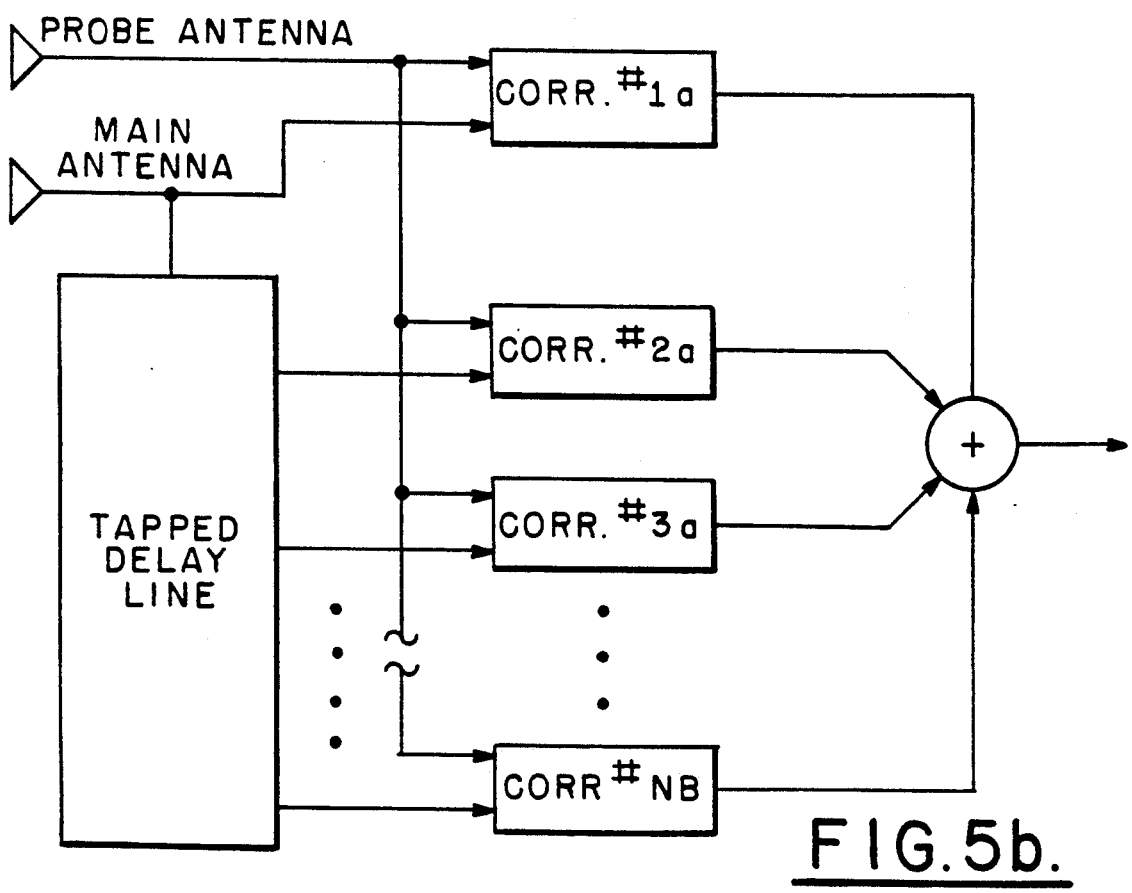

Correlators of this type, which may be implemented at RF, IF or at video with I and Q processing, are well known in the art. A block diagram of one such correlator is shown in FIG. 4. A complex signal received on the main lobe of the probe array of magnitude $S_P$ and phase angle $\phi$ is coupled to a conjugating network 27 wherefrom the complex conjugate of the received signal is coupled to a correlation mixer 29 wherein it is multiplied with the complex signal received by the main array having magnitude $S_M$ and phase angle $\theta$. The output signal of the correlation mixer 29, having a magnitude $S_M S_P$ and phase angle $\theta-\phi$, is coupled to an integrator 31 which integrates this product signal over a time interval T which is the inverse of the transmitted signal bandwidth. The parameter $t_O$ is a delay dependent upon the path length difference a signal from the interfering source traverses to the main and probe antennas. Two antennas with a phase center separation of approximately 2 meters exhibit a time of arrival differential in the order of 2.3 nanoseconds for an interfering source located at ±20° from the normal to the probe and main antennas. If the integration time T is less than this value, no correlation would occur. This could be overcome by operating a number of parallel correlators operating off tapped delay lines as illustrated in FIG. 5A wherein the arrival of the signal from the interfering source at the main antenna precedes the time of arrival at the probe antenna and in FIG. 5B where the signal arrives at the probe antenna before it arrives at the main antenna. An alternative approach is to provide an appropriate delay between one of the antenna inputs to the correlator that is preset in accordance with the known interfering source elevation angle, which may be determined by directing the main beam of the main antenna to the interfering source. Signals at the output of the integrator 31 may still contain traces of interfering signals from other sources. To minimize these trace signals, and emphasize the desired correlation signal from the multiplicity of signal transmissions, the output signal of the integrator 31 may be added in a summation network 33 wherein the desired correlation signals add coherently to provide an output signal which is predominantly $S_M S_P \exp[j(\theta-\phi)]$.

To determine the gain in the sidelobe region of the main array, a parallel correlator having a multiplier 34, to which the signal from the probe array and its conjugate are coupled, is provided to establish a signal $S_P^2$ which is integrated in integrator 36 over the same limits as the product of the main array and probe array in integrator 31. The output of the integrator is summed in summation circuit 38 over the same number of samples as the output of the integrator 31 in summation network 33. The output signals from the two summation networks 33 and 38 are coupled to a divider circuit 40 which provides a signal which is the ratio of the complex gains of the main antenna in the sidelobe region to the complex gain of the probe antenna, thereby providing a signal representative of $G_{MS}/G_P \exp[j(\theta-\phi)]$, where $G_{MS}$ is the gain of the main antenna at the sidelobe of interest and $G_P$ is the measured gain at the peak of the probe antenna. Since the complex gain of the probe antenna is known, it is but a simple matter to compute the complex gain of the main antenna in the sidelobe of interest. The computed complex gain of the main antenna and the sidelobe of interest may then be utilized to calculate the complex coefficients C and C*.

Refer now to FIG. 6 wherein a processor 39 in the beam steering computer 12 for determining the phase perturbation coefficients is shown. The real components $g_R(u_N)$ and $g_R(2u_N)$ are stored in memories 41 and 43 respectively while the known value $g_R(O)$ is stored in memory 45. Similarly, the imaginary components $g_I(u_N)$, $g_I(2u_N)$ and $g_I(O)$ are stored in memories 47, 49, and 51, respectively. When the gain values for providing J nulls are simultaneously available, they are coupled to computers 53 and 55 wherein the real $C_R$ and imaginary $C_I$ coefficients, respectively, for each of the J complex coefficients are determined. These coefficients are then coupled to a third computer 57 wherefrom the phase perturbation coefficients A and B are provided.

Figure 7:
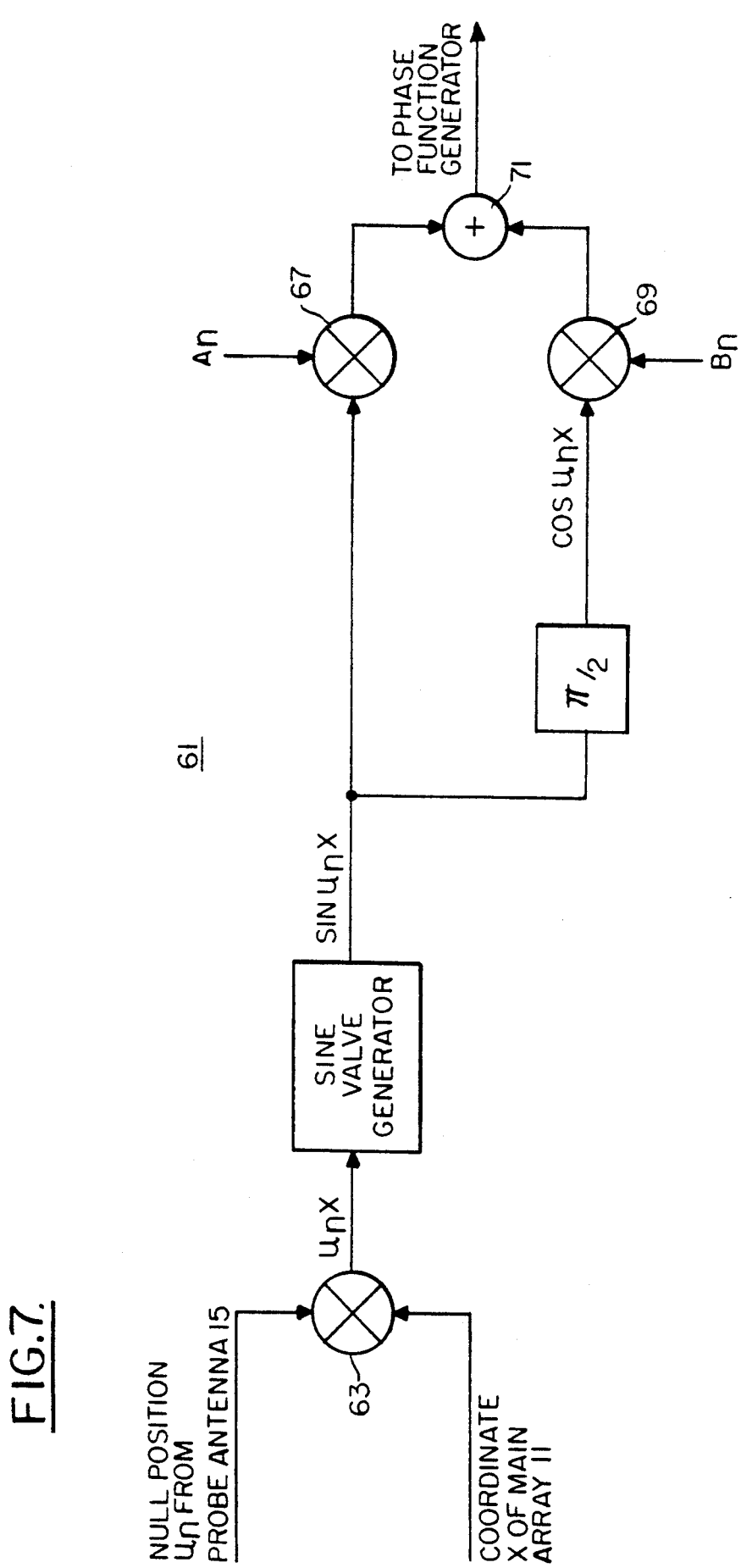
FIG. 7 is a block diagram of a perturbation function generator which may be utilized in the beam steering computer of FIG. 1.

A perturbation function generator 61, which may included in the beam steering computer 12, is shown in FIG. 7. Null positions $u_n$ are multiplied by a coordinate x of the main array 11 in multiplier 63 to provide a value $a_n X$. This value is coupled to a sine generator 65 wherefrom a value $\sin(U_n x)$ is coupled to a multiplier 67, to which $A_n$ from the processor 39 is also coupled, and through a 90° phase shifter to couple a value $\cos(u_n x)$ to a multiplier 69, to which $B_n$ from the processor 39 is also coupled. The values resulting from the multiplications in multipliers 67 and 69, respectively $A_n \sin(U_n x)$ and $B_n \cos(U_n x)$ are added in circuit 71 to obtain the phase perturbation function $$a(x) = A_n \sin(U_n x) + B_n \cos(U_n x)$$

This phase perturbation function is coupled to the phase function generator in the beam steering computer to establish a perturbated phase function which provides a null in the pattern of the main array 11 at the desired angular position.

While the invention has been described in its preferred embodiment, it is to be understood that the words which have been used are words of description rather than limitation and that changes may be made within the purview of the appended claims without departing from the true scope and spirit of the invention in its broader aspects.

We claim:

1. An apparatus for adaptively positioning nulls at desired locations in a beam pattern of an antenna having a main lobe and sidelobes at angular positions determined by a phase function applied to the antenna comprising:

steerable probe antenna means having a predetermined probe beam with a probe beam main lobe and a predetermined probe beam main lobe peak gain for positioning said probe beam main lobe at angular locations of interfering sources at which nulls in said pattern of said antenna are desired; and phase perturbation means responsive to signals received from said predetermined probe beam and from said beam pattern for establishing phase perturbation functions and applying said phase perturbation functions to said phase function of said antenna to create a perturbated phase function for said antenna that establishes nulls in said beam pattern of said antenna at said angular locations.

2. The apparatus of claim 1 wherein said phase perturbation means includes:

correlating means coupled to said antenna and said steerable probe antenna means for correlating signals received by said beam pattern with signals received by said probe beam main lobe to provide signals representative of complex gains of said antenna, relative to said predetermined probe beam main lobe peak gain, at angular locations in said beam pattern corresponding to a positions of said predetermined probe beam main lobe; and perturbing means coupled to said antenna and responsive to said complex gain representative signals for establishing said phase perturbation function and applying said phase perturbation function to said phase function to create said perturbated phase function in a manner to position nulls in said pattern of said antenna at said angular locations.

3. The apparatus of claim 2 wherein said perturbing means includes:

means for providing sinusoidaal functions of a coordinate of said antenna;

means coupled to receive said complex gain representative signals for determining phase perturbation coefficients for said sinusoidal functions;

means coupled to said determining means and said sinusoidal function means for applying said phase perturbation coefficients to said sinusoidal functions to establish said phase perturbated function; and means coupled to said applying means and said antenna for perturbing said phase function with said perturbated function.

4. The apparatus of claim 3 wherein said correlating means includes:

complex conjugate means coupled to said steerable probe antenna means for providing signals that are representative of complex conjugates of said signals received by said probe antenna means, thereby providing complex conjugate signals;

product means coupled to said antenna and said complex conjugate means for providing signals representative of products of said signals received by said antenna and said complex conjugate signals, thereby providing product signals; and gain means coupled to said steerable probe antenna means, said complex conjugate means, and said product means for providing signals representative of said complex gains of said antenna.

5. The apparatus of claim 4 wherein said gain means includes:

complex product means coupled to said complex conjugate means and said steerable probe antenna means for providing signals representative of products of said complex conjugate signals and said signals received by said steerable probe antenna means, thereby providing complex product signals;

integrator means coupled to said product means and said complex product means for integrating said product signals and said complex product signals, thereby providing integrated product signals and integrated complex product signals; and divider means coupled to said integrator means for providing signals representative of said integrated product signals divided by said integrated complex product signals, thereby providing said signals representative of complex gains.

6. The apparatus of claim 5 wherein said phase perturbing means includes:

storage means coupled to said divider means for storing said signals representative of complex gains and signals representative of a main lobe gain of said antenna;

complex coefficient means coupled to said storage means for computing complex coefficients of complex gains that establish a null at a desired location in said pattern; and perturbation coefficient means coupled to said complex coefficient means for computing said phase perturbation coefficients.

7. The apparatus of claim 6 further including delay means coupled to said correlating means, said steerable probe antenna means, and said antenna for delaying signals received by said steerable probe antenna means and said antenna and providing delayed received signals to said correlating means.

8. The apparatus of claim 2 wherein said correlating means includes:

complex conjugate means coupled to said steerable probe antenna means for providing signals that are representative of complex conjugates of said signals received by said steerable probe antenna means, thereby providing complex conjugate signals;

product means coupled to said antenna and said complex conjugate means for providing signals representative of products of said signals received by said antenna and said complex conjugate signals, thereby providing product signals; and gain means coupled to said steerable probe antenna means, said complex conjugate means, and said product means for providing signals representative of a complex gain of said antenna.

9. The apparatus of claim 8 wherein said gain means includes:
complex product means coupled to said complex conjugate means and said steerable probe antenna means for providing signals representative of products of said complex conjugate signals and said signals received by said steerable probe antenna means, thereby providing complex product signals;
integrator means coupled to said product means and said complex product means for integrating said product signals and said complex product signals, thereby providing integrated product signals and integrated complex product signals; and
divider means coupled to said integrator means for providing signals representative of said integrated product signals divided by said integrated complex product signals, thereby providing said signals representative of complex gains.

10. The apparatus of claim 9 wherein said perturbing means includes:
storage means coupled to said divider means for storing said signals representative of complex gains and signals representative of a main lobe gain of said antenna;
complex coefficient means coupled to said storage means for computing complex coefficients of complex gains that establish a null at a desired location in said pattern; and
perturbation coefficient means coupled to said complex coefficient means for computing said phase perturbation coefficients.

11. The apparatus of claim 2 further including delay means coupled to said correlating means, said steerable probe antenna means, and said antenna for delaying signals received by said steerable probe antenna means and said antenna and providing delayed received signals to said correlating means.

12. The apparatus of claim 1 wherein said main lobe of said probe beam main lobe has a beam width that is comparable to a beam width of a main lobe of said antenna.

13. A method for obtaining nulls at desired angular locations in a beam pattern of an antenna having a main lobe and sidelobes at angular positions determined by a phase function applied to the antenna comprising the steps of:
positioning a mian lobe of a steerable probe antenna to receive signals from interfering sources;
determining complex gains, relative to a measured peak gain of said main lobe of said steerable probe antenna, at angular positions in said beam pattern corresponding to locations of said interfering sources;
utilizing said complex gains to compute a phase perturbation for said phase function to establish nulls in said beam pattern at said angular locations; and
applying said phase perturbations to said phase function.

14. The method of claim 13 wherein the determining step includes the steps of:
multiplying signals received by said antenna by complex conjugates of signals received by said steerable probe antenna to obtain product signals;
squaring magnitudes of said signals received by said steerable probe antenna to obtain probe antenna squared signals; and
dividing said product signals by said squared signals to obtain said complex gain.

15. The method of claim 13 wherein the step of computing phase perturbations includes the step of establishing coefficients of sinusoidal functions utilized for said phase perturbations from said complex gain and said main lobe gain.

* * * * *